United States Patent
Meijer et al.

(10) Patent No.: US 7,680,765 B2
(45) Date of Patent: Mar. 16, 2010

(54) ITERATE-AGGREGATE QUERY PARALLELIZATION

(75) Inventors: Henricus Johannes Maria Meijer, Mercer Island, WA (US); Ralf Lammel, Redmond, WA (US); Brian C. Beckman, Newcastle, WA (US)

(73) Assignee: Microsoft Corporation, Redmond, WA (US)

( * ) Notice: Subject to any disclaimer, the term of this patent is extended or adjusted under 35 U.S.C. 154(b) by 180 days.

(21) Appl. No.: 11/616,712

(22) Filed: Dec. 27, 2006

(65) Prior Publication Data

US 2008/0162409 A1 Jul. 3, 2008

(51) Int. Cl.
G06F 17/30 (2006.01)

(52) U.S. Cl. .................. 707/2; 707/3; 707/4; 707/102; 707/201; 717/113; 717/114; 717/116; 717/151

(58) Field of Classification Search .................. None
See application file for complete search history.

(56) References Cited

U.S. PATENT DOCUMENTS

| | | | |
|---|---|---|---|
| 6,691,101 B2 | 2/2004 | MacNicol et al. | |
| 6,910,032 B2 | 6/2005 | Carlson et al. | |
| 7,047,252 B2 | 5/2006 | Buch et al. | |
| 7,092,951 B1 | 8/2006 | Luo et al. | |
| 2003/0187854 A1 | 10/2003 | Fairweather | |
| 2004/0098373 A1 | 5/2004 | Bayliss et al. | |
| 2004/0187075 A1 | 9/2004 | Maxham | |
| 2004/0260684 A1* | 12/2004 | Agrawal et al. | 707/3 |
| 2005/0192921 A1* | 9/2005 | Chaudhuri et al. | 707/1 |
| 2005/0262045 A1 | 11/2005 | Tsuchida | |
| 2006/0041599 A1 | 2/2006 | Tsuchida | |
| 2006/0080285 A1 | 4/2006 | Chowdhuri | |
| 2006/0218123 A1* | 9/2006 | Chowdhuri et al. | 707/2 |

FOREIGN PATENT DOCUMENTS

| | | |
|---|---|---|
| WO | 0020997 | 4/2000 |
| WO | 2005076160 | 8/2005 |

OTHER PUBLICATIONS

Calicrates Policroniades-Borraz. Decomposing file data into discernible items. University of Cambridge Computer Laboratory Technical Report, No. 672. Aug. 2006. http://www.cl.cam.ac.uk/TechReports/UCAM-CL-TR-672.pdf. Last accessed Sep. 14, 2006.
Goetz Graefe. Volcano-An Extensible and Parallel Query Evaluation System. IEEE Transactions on Knowledge and Data Engineering, vol. 6, No. 1, Feb. 1994. http://ieeexplore.ieee.org/iel3/69/6750/00273032.pdf?tp=&arnumber=273032&isnumber=6750&htry=1. Last accessed Sep. 14, 2006.
Sandra De F. Mendes. An Experimental Performance Evaluation of Join Algorithms for Parallel Object Databases. http://www.cs.man.ac.uk/~norm/papers/europar2001.pdf#search=%22Performance%20Analysis%20of%20Parallel%20Query%20Processing%20Algorithms%20for%20Object-Oriented%20Databases%22. Last accessed Sep. 14, 2006.
Matrix chain multiplication. http://en.wikipedia.org/wiki/Chain_matrix_multiplication. Last accessed Dec. 27, 2006. 3 pgs.

* cited by examiner

Primary Examiner—Apu M Mofiz
Assistant Examiner—Anteneh Girma
(74) Attorney, Agent, or Firm—Turocy & Watson, LLP (57) ABSTRACT

Iterate-aggregate shape queries are executable in an efficient parallel manner. Techniques are utilized that leverage properties of aggregations to implement such a query in a highly parallelized manner utilizing one or both of vertical and horizontal parallelism. More specifically, queries can be recursively evaluated in parallel utilizing partitioning and repartitioning mechanisms. Distributed query execution results over a subset of input data are repartitioned and aggregated to produce a final result.

20 Claims, 11 Drawing Sheets

ITERATE-AGGREGATE QUERY PARALLELIZATION

BACKGROUND

Technology advancements and cost reductions over time have enabled computers to become commonplace in society. Enterprises employ computers to collect and analyze data. For instance, computers can be employed to capture data about business customers that can be utilized to track sales and/or customer demographics. Further yet, individuals also interact with a plurality of non-enterprise computing devices including home computers, laptops and mobile devices. As a consequence of computer ubiquity, an enormous quantity of digital data is generated daily by both enterprises and individuals.

Large quantities of such data are housed in one or more databases and/or data warehouses. A database is a collection of data or facts organized in a systematic manner and persisted to a storage device. Similarly, a data warehouse is a much larger repository composed of a plurality of databases. In one instance, businesses can store customer information (e.g., name, address, product(s) purchased, date, location . . . ) to one or more data databases. For example, a transactional database can capture current data and aged data can be pushed to a warehouse. In another instance, entity and/or individual web pages can be housed in one or more databases.

Various components and/or systems are associated with respective stores to facilitate interaction with database data. For example, database management systems (DBMS) and warehouse management systems (WMS) provide functionality to manage requests or queries from users and/or programs, amongst other things. Upon receipt of a query, results that satisfy the query are returned. In this manner, users need not be knowledgeable as to how and where data is physical stored. Rather, programmers implement and expose an interface to users, which hides or abstracts details.

While such functionality is convenient for users, back-end query processing is difficult to implement efficiently especially over large data sets. Processing large quantities of data for data mining or analysis, for example, is problematic at least because the data set size is not conducive to simple sequential processing, as this results in unacceptable latency with respect to response time. Consequently, techniques need to be developed and employed to facilitate parallel and/or distributed processing. While problematic in its own right, this task is complicated by the fact that programmers conventionally need to understand much about the low-level details necessary for parallel and distributed execution.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to parallelization of iterate-aggregate shaped queries to enable efficient execution over large data sets. According to an aspect of the disclosure, systems and methods are provided that employ vertical and horizontal parallelism to process such queries. More specifically, large data collections can be partitioned and queries executed over such partitions in parallel. This vertical partitioning can also be recursive in that initially partitioned data can be repartitioned by resources where appropriate. Results from pipelined query execution can be repartitioned and reduced to produce final results. Further, such repartitioning and aggregation can occur concurrently with other operations to provide a degree of horizontal parallelism.

In accordance with another aspect of the disclosure, mechanisms are provided to select optimal partitions. For example, information concerning a data collection and/or available resources can be utilized to identify partitions that will optimize query execution. In one embodiment, a generalization of a matrix multiplication algorithm utilizing dynamic programming can be utilized select the partitions.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Systems and methods are disclosed that facilitate parallelization of iterate-aggregate shaped queries or programs. More specifically, the query can be executed recursively in parallel via employment of partitioning and repartitioning mechanisms. Partitioning segments input data for distributed query processing across multiple resources. Results thereof are repartitioned and provided to a base query instance for final aggregation, which can occur concurrently with other operations. In this manner, the query execution can be parallelized both vertically and horizontally. Furthermore, optimal initial partitioning can be determined as a function of information about input data and/or resource availability.

Various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
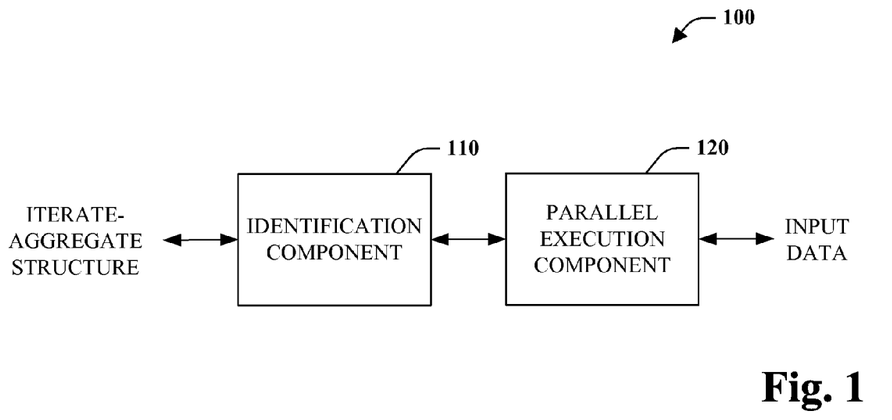
FIG. 1 is a block diagram of a query execution system.

Referring initially to FIG. 1, a query execution system 100 is illustrated in accordance with an aspect of this disclosure. The system 100 is a mechanism for efficient and expeditious evaluation of queries of a particular shape. More specifically, the system 100 provides for parallel execution of such queries to mitigate latency associated with processing large data sets, inter alia. Such functionality can be provided alone or in combination with a larger query processor and/or execution environment. The system includes query identification component 110 and parallel execution component 120 communicatively coupled.

The query identification component 110 identifies iterate-aggregate shape structures such as queries and programs. The iteration phase of a query maps key-value pairs to new key-value pairs. The subsequent aggregation phase consolidates key-value pairs sharing keys to single value pairs in accordance with some algorithm. In one instance, an goal of an iterate-aggregate mechanism can be to apply some function over a data set and subsequently group and aggregate results into a result set.

By way of example and not limitation, the below query counts the number of occurrences of each word W in a collection of documents:

```
From D in Documents, W In Words(D)
Group By K = W.ToLower( )
Aggregate N = Count( )
Select K, N
```

Here, the clause "From D in Documents, W In Words(D)" is the iteration function and the clauses "Group By K=W.ToLower( )" and "Aggregate N=Count( )" define the aggregation. The remaining clause "Select K, N" denotes a projection identifying results to return. Where applied to the collection of documents {"the quick brown fox", "jumped over the lazy dog"}, the result collection of key-value pairs would be {("the", 2), ("quick", 1), ("brown", 1) . . . }.

In another example, iterate-aggregate may take the form of a language integrated query, where the program is of the form:

```
Input = => Q
Dim Q =    From D In Input
           From L In U(D), X = F(D, L)
           Group By K = G(D, L, X)
           Aggregate A = O(H(D, L, X, K))
           Return I(K, A)
```

In this case, the iteration phase is "From D In Input, From L In U(D), X=F(D, L)." Given a collection Input={ . . . , D, . . . } where U(D) is a collection { . . . , L, . . . }, this clause creates a collection (e.g., Cartesian product) of triples { . . . , {D, L, X}.A. The group by and aggregate clauses correspond to the aggregation phase while the return clause projects results. In accordance with one embodiment, expression trees can be utilized to represent such programmatic constructs to facilitate parallel execution thereof as described infra.

The parallel execution component 120 receives, retrieves or otherwise obtains identification of an iterate-aggregate structure from identification component 110. The execution component 120 subsequently executes and/or evaluates the structure in parallel. In one embodiment the execution component 120 can perform recursive parallel execution across available resources. Parallelization can thus be one or both of vertical and/or horizontal. For example, input data can be partitioned, multiple instances of the query executed over the partitions, partial results repartitioned and combined to produce a final result.

Figure 2:
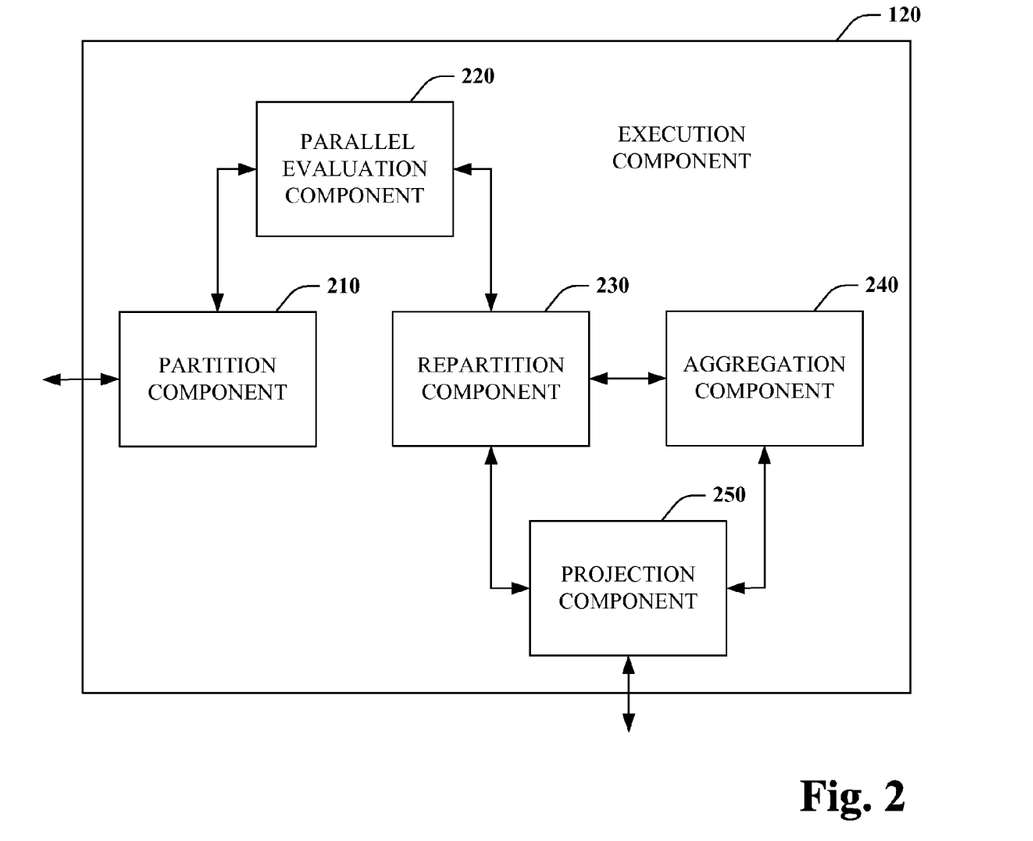
FIG. 2 is a block diagram of a parallel execution component.

FIG. 2 illustrates a representative execution component 120 in accordance with an aspect of the disclosure. As previously described, the execution component is operable to efficiently execute iterate-aggregate shaped queries or the like. The execution component 120 includes a partition component 210 that provides a mechanism to partition or segment an input collection for processing. Parallel evaluation component 220 is operable to evaluate or process queries in a distributed and/or parallel manner. Multiple instances of a single query can thus be executed over partitions of data on disparate machines that need not have knowledge of one another. Repartition component 230 can receive, retrieve or otherwise acquire query results from the parallel evaluation component 220 or components thereof and repartition the results by like keys, for example. Aggregation component 240 reduces a set of repartitioned results to a single response. For instance, an aggregate function can be utilized to compute a sum, average or any user defined aggregate. Repartitioned reduced results can be rendered, displayed or otherwise provided by the projection component 250 in accordance with a designated format.

Execution component 120 provides a mechanism that facilitates horizontal or flat parallelism. Horizontal parallelism occurs when multiple independent operations can be executed simultaneously. After partitioning an input collection via partition component 210, the functionality provided by parallel evaluation component 220 and repartition component 230 can be executed concurrently or substantially simultaneously. In particular, a local query evaluation can be done while repartitioning is in progress. It is not necessary to process a complete result prior to provisioning information. In fact, any intermediate result from a group can be provided and/or retrieved by the repartition component 230 for processing. By contrast, the aggregation component 240 needs to await all information before providing results. Even so, the processing may be parallelized, for instance by performing aggregation incrementally upon availability of input data.

In addition to horizontal parallelism, the execution component 120 can take advantage of vertical or tree wise parallelism. As previously described, a partitioned data source can be executed in parallel across multiple machines. It should also be appreciated that the recursive nature of such vertical partitioning allows initially segmented data to be partitioned and executed in parallel in a manner that resembles the initial or base processing. Consequently, such the execution component 120 is highly scalable.

By way of example, suppose data is processed initially by machines "A" and "B." Subsequently, these machines can partition and process designated data across machines "$A_1$" and "$A_2$" and "$B_1$", "$B_2$" and "$B_3$," respectively. Among other things, this supports a growth model for data centers and/or capacity planning for data centers. Flat or horizontal parallelism alone is not easily scalable. As such, the only way to grow a data center is to add more machines are redo everything. However, where there is vertical or tree wise parallelism, inherent support is provided for simply adding a new set of one or more machines.

Various types of control can be employed to effectively manage horizontal and vertical parallelism. As provided supra, horizontal parallelism allows each node or operation to be executed in parallel with other nodes or operations, whereas vertical parallelism occurs where processing acts are executed in a separate pipelined fashion. One or more mechanisms can be employed in conjunction with pipeline processing to regulate speed using some form of handshaking (e.g., two/four phase) and/or a push or pull model. In this manner, benefits of both horizontal and vertical parallelism can be maximized.

Figure 3:
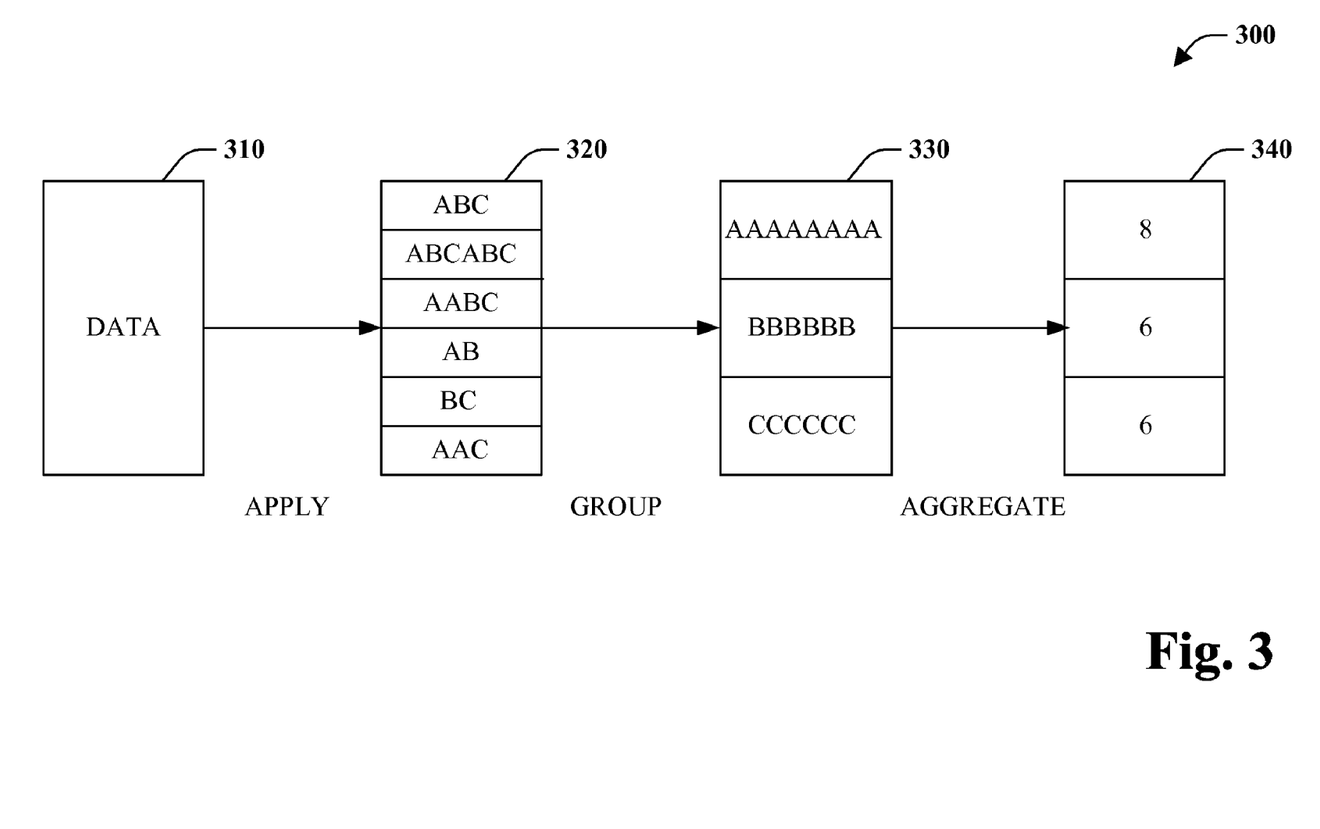
FIG. 3 is a block diagram of an exemplary process flow associated with execution of iterate-aggregate query.
Figure 4:
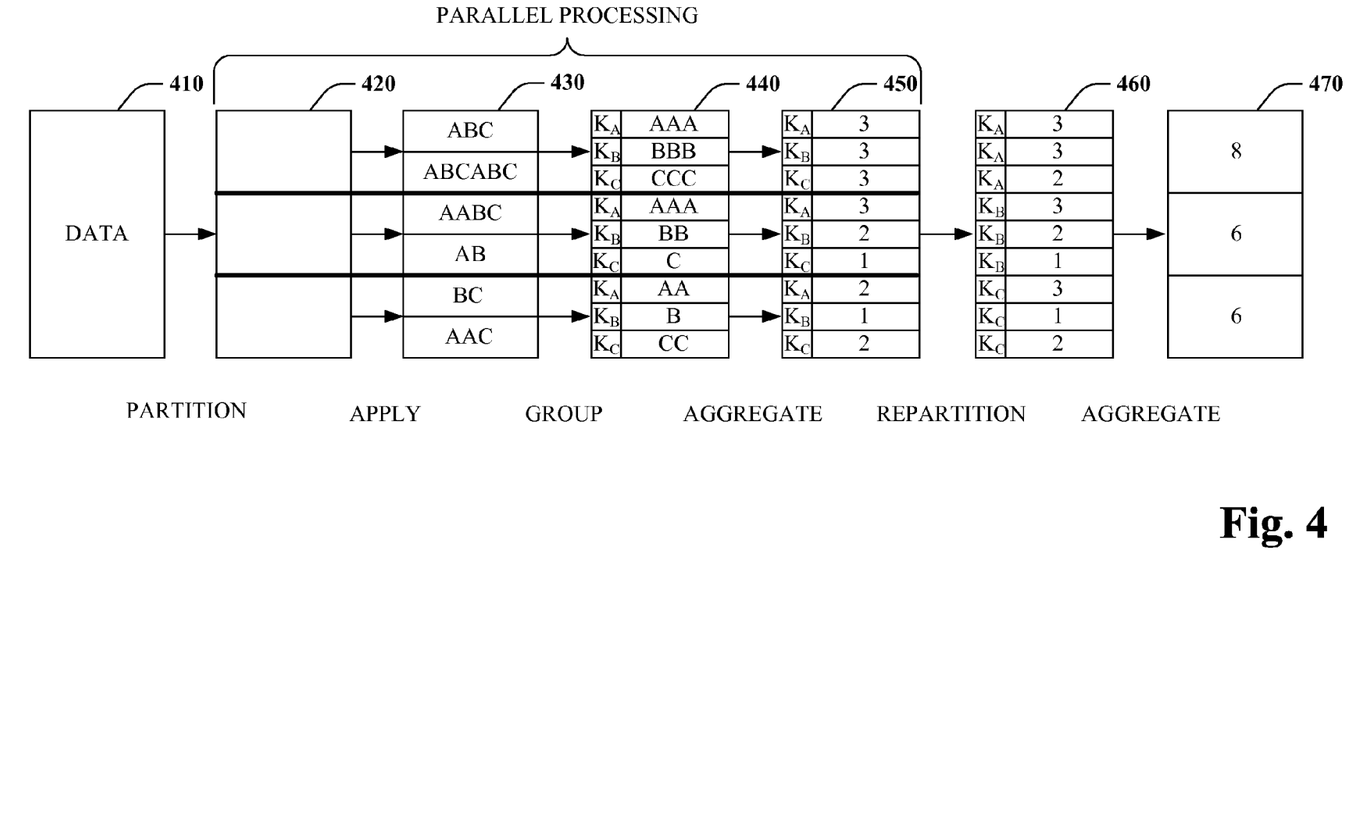
FIG. 4 is a block diagram of an exemplary process flow associated with execution of an iterate-aggregate query.

FIGS. 3 and 4 provide exemplary process flows 300 and 400 associated with execution of an iterate-aggregate query, respectively. These examples are not meant to limit the scope of the claims, but rather to facilitate clarity and understanding with respect different execution mechanisms. For purposes of simplicity, the examples both relate to determining the number of letters "A," "B" and "C" that appear in an input collection.

Turning attention to first to FIG. 3, the exemplary process flow 300 is depicted. As shown, a received collection of data 310 is acquired and applied to an alternative structure in table 320. For instance, a given data structure can be mapped to several documents including a plurality a letters. The data in table 320 can then be grouped by letter to produce table 330. In this simplified example, there are only three letters "A," "B" and "C," thus there are three groups corresponding thereto. Finally, an aggregation is performed to determine the number of occurrences of each letter and provided in table 340. For the most part, the process 300 is sequential requiring each act to be complete before moving to the next act. However, the final action of determining occurrences from table 330 can be executed in parallel across disparate machines, as each result is independent of one another. In other words, the final action is horizontally parallelizable. Unfortunately, such a one-pass type approach with respect to iteration and grouping is not a viable option with respect to large data sets.

FIG. 4 depicts the exemplary process flow 400 in accordance with an aspect of the disclosure. The process flow 400 introduces a higher degree of parallelism by taking advantage of the associative properties of aggregation, for example. As with flow 300 of FIG. 3, process flow 400 begins with a collection of data, labeled 410. The data can then be partitioned into separate groups for processing as show at 420. For example, a range of keys (K) can be employed to split data into three equal groups.

Each partition can subsequently be processed independently by applying the same query to each partition. As shown at 430, an iteration function is applied to each partition to structure data in a particular manner, for example by documents including a plurality of letters. A grouping is then performed on each partition to produce a plurality of key-value pairs 440. The key can be computed based on distinct values. For example, here $K_A$ (key A) identifies a group of A's, $K_B$ (key B) identifies a group of B's and $K_C$ (key C) identifies a group of C's. Aggregations or partial aggregations can be performed for each key as shown at 450.

Results associated with each partition are repartitioned based on their key. As shown at 460, the partial aggregates associated with "A" are listed, followed by "B" and finally followed by "C." Note that from the perspective of a locally executing query on a node with partition keys in range, a repartition of a table (450) Xs on key k is a filter expression of the form From X in Xs Where (X.k in Range). This implies that a local query can be started while the partitioning is still in progress. Note also that selection of a key and repartitioning based on the key can be combined when a Select operator sends tuples it creates to the proper node for processing. Again, there is a possibility for pipelined processing of the query.

The repartitioned partial results of table 460 can subsequently be aggregated to produce final aggregated results afforded in table 470. In other words, an aggregate of aggregates is computed. Unlike other actions, all input for each key should be received prior to calculation of the final aggregate. However, this may also be done incrementally as input is acquired.

Note that machine communication is commenced after aggregation. Since machine-to-machine communication is expensive, it is important to limit such communication. While communication could have been initiated after grouping forming table 440 (the keys are available), this need not be done at this point, as the amount of data transfer and time would be great. Instead, machine communication is confined to a time period in which the data to be transferred is relatively small, namely after partial aggregation. For example, rather than transmitting ten characters associated with a key, the number ten can simply be communicated The data corresponding to blocks and/or tables 430, 440 and 450 correspond to distributed execution. In one instance, the implementation can be similar to that provided in process 300 of FIG. 3. That is, this implementation may be used where resources dictate or it is not efficient to partition data for processing. Alternatively, the partition and repartition implementation can be employed where efficient processing results and resources are available. Such an implementation is recursive in nature in that partitioning is available at every level until a case is reached in which partitioning in not efficient and/or resources are not available. Results then fall through the levels until a final result is obtained.

Note that the same results are obtained from both process 300 and process 400. While process 300 is effective for smaller data sets and provides at least a degree of vertical parallelism, it is not efficient with respect to large data sets. In contrast, process 400 is much more efficient in that it can take advantage of both vertical and horizontal parallelism via recursive parallelism in conjunction with partitioning and repartitioning.

Figure 5:
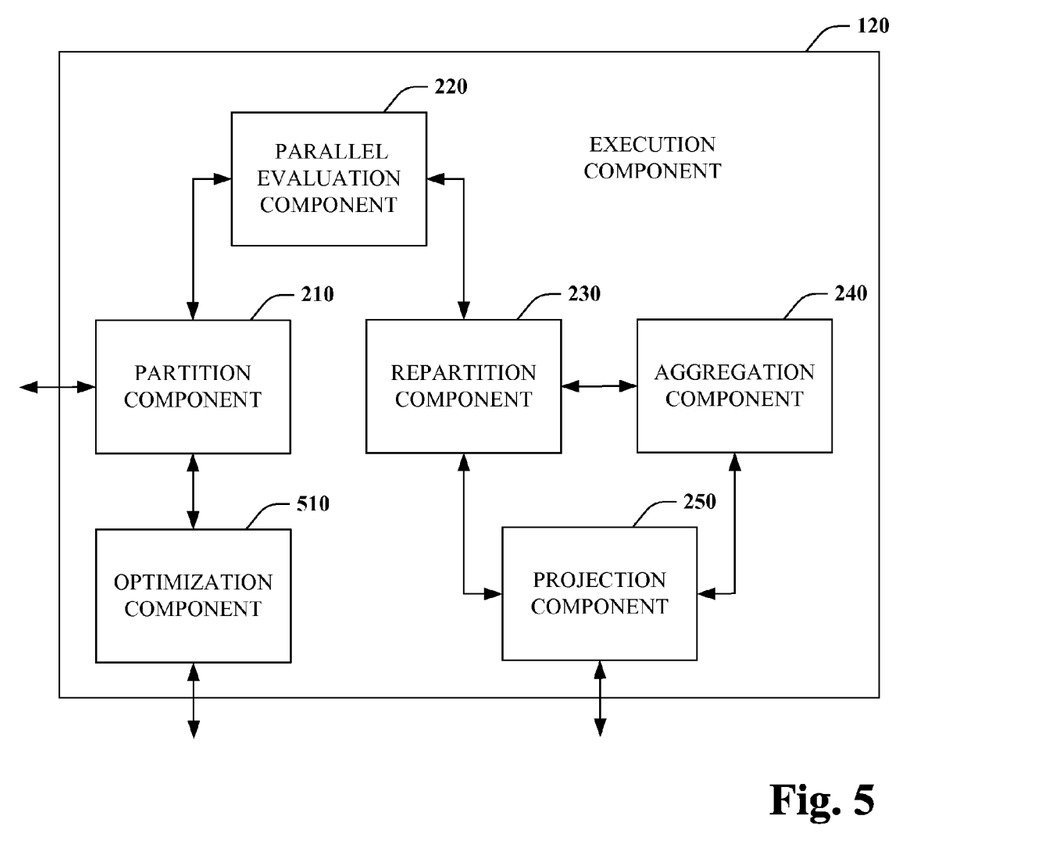
FIG. 5 is a block diagram of a query execution system that employs optimal partitions.

FIG. 5 illustrates an embodiment of the execution component 120 that operates on optimal partitions in accordance with an aspect of the disclosure. Similar, to execution component 120 of FIG. 2, the execution component 120 includes the partition component 210, parallel execution component 220, repartitioning component 230, aggregation component 240 and projection component 250. In brief, these components facilitate vertical and/or horizontal parallel processing of iterate-aggregate type queries. The partition component 210 divides an initial data set into partitions or segments over which instances of an iterate-aggregate query are executed in a distributed fashion. Partial results are subsequently or concurrently repartitioned and aggregated to produce final reduced results. However, it has been observed that the initial partitioning of a data set can significantly affect the efficiency of process execution. There can be orders of magnitude difference in execution based on selected partitioning. Thus, it is not always best to segment data equally across distributed resources. Accordingly, execution component 120 also includes an optimization component 510 that identifies optimal partitions to be utilized by the partition component 210.

The optimization component 510 can identify optimal partitions as a function of static information about a data collection and/or available resources. For example, based on the size of the data collection and the processing power of distributed resources, data can be partitioned in a manner that is likely to optimize execution speed. Accordingly, partitions can be inferred (as that term is defined herein) based on contextual information about the data set and/or resources.

In accordance with one embodiment, the optimization component 510 can employ a modified matrix multiplication algorithm. In matrix multiplication, the way in which associative operations are parenthesized is critically important to performance. For example, suppose "A" is a 10×20 matrix, "B" is a 30×5 matrix and "C" is a 5×60 matrix. Although multiplication of "A," "B" and "C" will return the same result, 4,500 operations are required to execute the multiplication where parenthesized as "(AB)C" and 27,000 operations are required to execute the multiplication where parenthesized as "A(BC)." To identify the best way to parenthesize the multiplication, dynamic programming is employed to estimate cost, wherein a solution is broken up into a set of related sub-problems, the sub-problems are solved and the solutions used to obtain the solution for a bigger problem. This is a bottom-up approach, which can be generalized and employed by optimization component 510 with respect to identifying optimal partitions. More specifically, a grouping can be thought of as a matrix and broken down into sub-matrices or subgroups. Estimated, determined or inferred costs associated with each subgroup can subsequently be utilized to determine the cost associated with larger groups, which can be employed to identify optimal partitioning.

The aforementioned systems have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. For instance, the optimization component 510 could be external to the execution component 120. Further yet, one or more components and/or sub-components may be combined into a single component providing aggregate functionality. For example, the optimization component 510 could form part of the partition component 210. Communication between systems, components and/or sub-components can be accomplished in accordance with either a push and/or pull model. The components may also interact with one or more other components not specifically described herein for the sake of brevity, but known by those of skill in the art.

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the optimization component 510 can employ such mechanism to facilitate identification of optimal partitioning of a data collection.

Figure 6:
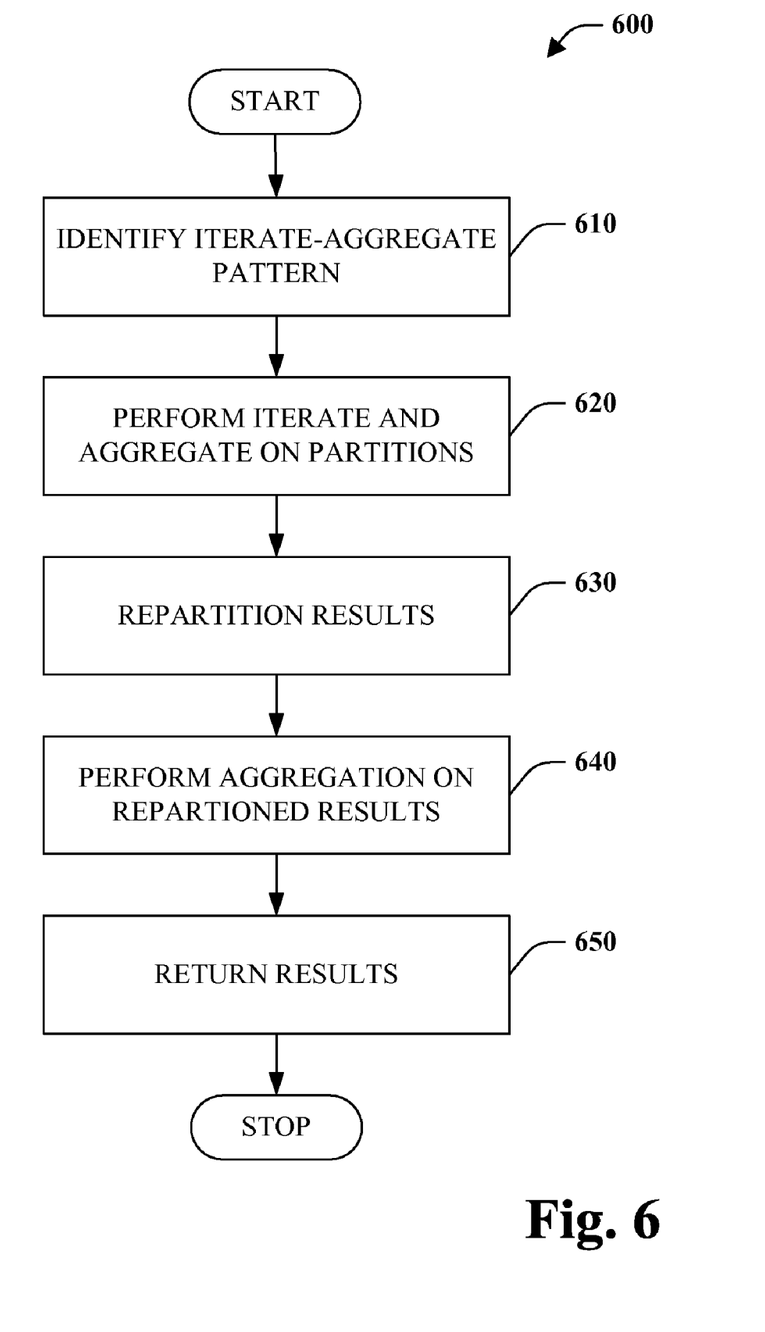
FIG. 6 is a flow chart diagram of a method of implementing iterate-aggregate type structures.
Figure 7:
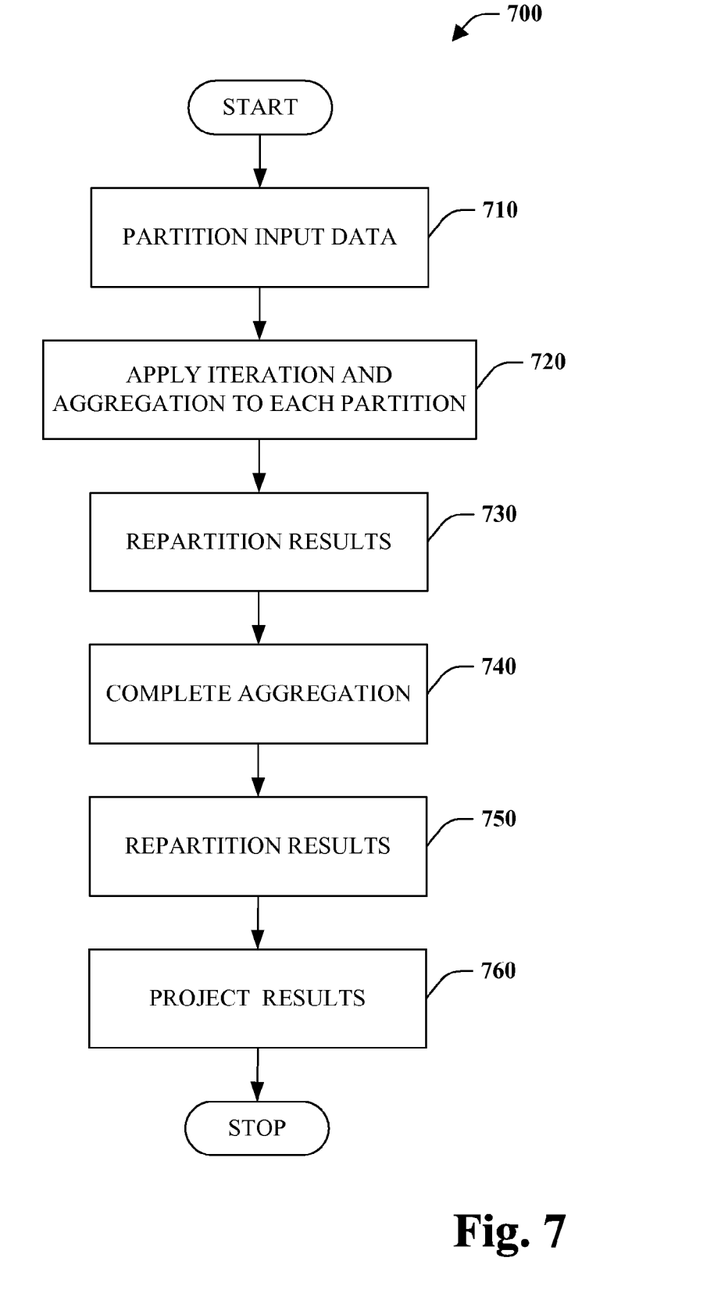
FIG. 7 is a flow chart diagram of a method of evaluating an iterate-aggregate shape query.
Figure 8:
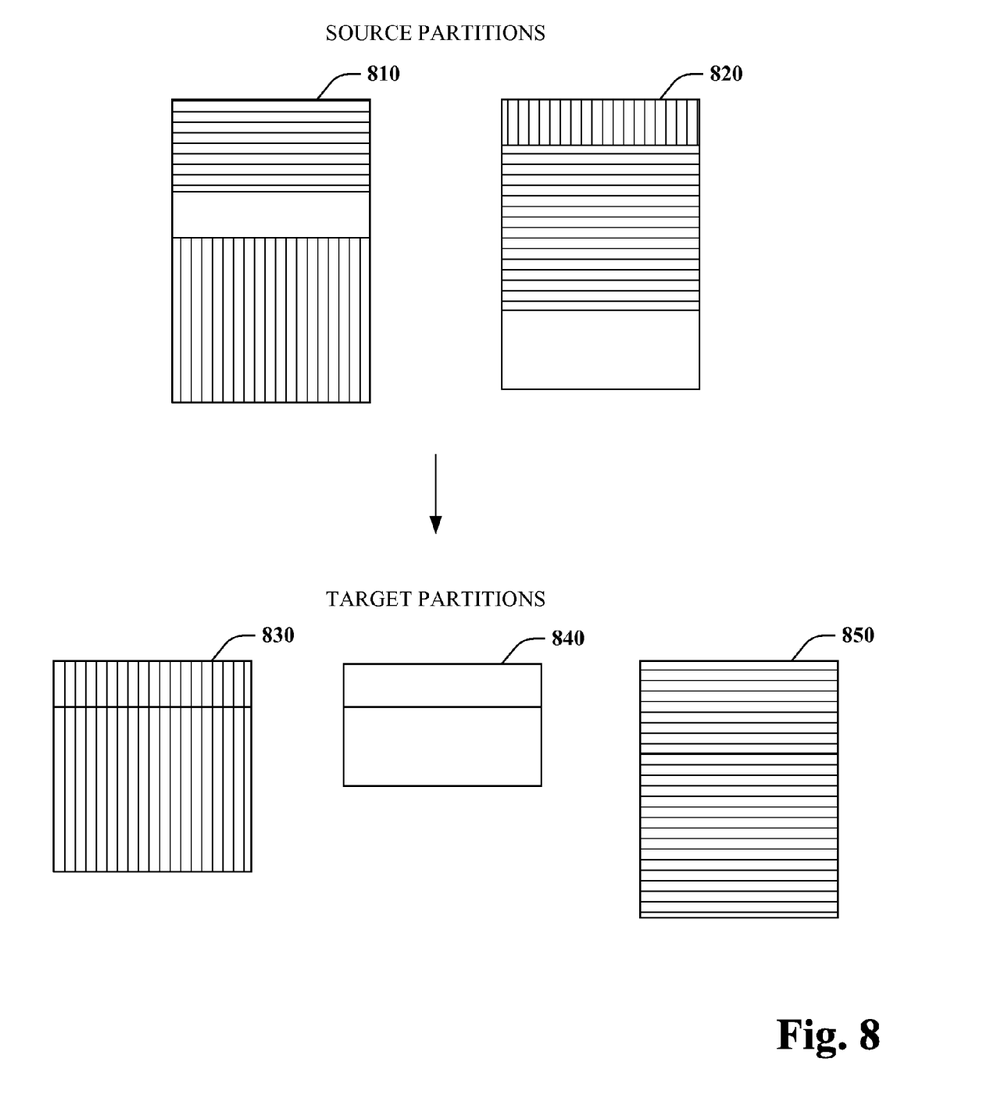
FIG. 8 is a block diagram illustrating repartitioning a source partition to a target partition.

In view of the exemplary systems described supra, methodologies that may be implemented in accordance with the disclosed subject matter will be better appreciated with reference to the flow charts of FIGS. 6-8. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Referring to FIG. 6, a method 600 of implementing iterate-aggregate type queries is illustrated. At reference numeral 610, an iterate-aggregate type pattern is identified. Such a pattern can include a functionality that maps data to key-value pairs and subsequently consolidates mapped key-value pairs sharing the same key to a single key-value pairs. For example, a function can be applied to each element of an input data set and results grouped and aggregated into a result set. It should be appreciated that such a pattern can include filtering, self-joins and arbitrary user-defined aggregates. Further yet, the structure can be a language-integrated query (LINQ), an integrated feature of a primary programming language (e.g., C#, Visual Basic . . . ). In this manner, a single declarative query can be defined for both in memory and external sources.

At numeral 620, an iteration and aggregate can be performed on a set of partitioned data. Iterate-aggregate functionality can be executed recursively in parallel across multiple machines. This provides vertical or tree wise parallelism that is easily scalable with addition of other processing means. For example, machines "A" and "B" can execute such functionality concurrently. Machine "A" may also chose to further partition and execute the same functionality across additional resources associated with machine "A." Additionally, it is to be noted that operations across each partition can be horizontally parallelized.

Results of the iterate-aggregate functionality can be repartitioned at numeral 630, for example utilizing a filter expression. Results can be of a key-value pair format. Repartitioning can combine results from partitioned execution into a single form organized by key. It should be appreciated that repartitioning can be accomplished concurrently with execution of local queries. In other words, pipelined query execution can be horizontally parallelized with repartitioning. Further yet, the selection of key-value pairs and repartitioning can be combined.

At reference 640, an aggregation is performed on repartitioned partial results. For example, this can correspond to aggregating aggregates. Final results can then be provided at numeral 650.

Referring to FIG. 7, a method 700 of evaluating an iterate-aggregate shape query is shown. As previously mentioned a program including such a query can be of the form:

```
Input = => Q
Dim Q =    From D In Input
           From L In U(D), X = F(D, L)
           Group By K = G(D, L, X)
           Aggregate A = O(H(D, L, X, K))
           Return I(K, A)
```

Here, the iteration phase is "From D In Input, From L In U(D), X=F(D, L)." Given a collection Input={ . . . , D, . . . } where U(D) is a collection { . . . , L, . . . }, this clause creates a collection (e.g., Cartesian product) of triples { . . . {D, L . . . , X}.A. The group by and aggregate clauses correspond to the aggregation phase while the return clause projects results. Programs of this form can be executed via the following five acts.

At reference numeral 710, an input collection can be partitioned based on some key range p computed on each D in the input: Input→ . . . , $Input_p$, . . . An iteration and partial aggregation can be applied to each partition in parallel, at 720, returning a collection of key-value pairs including computed keys and (partial) aggregations for each key:

```
From D In Input_p
From L In U(D), X = F(D, L0
Group By K = G(D, L, X)
Aggregate A = O((H(D, L, X, K))
Select K, A
```

At numeral 730, results from the above are repartitioned based on the key "K." The aggregation can be completed at 740 by finishing the partial aggregation for each range of "K's" and keying the result with the intended target node:

```
From P in PartialResults
Group By K = P.K
Aggregate A = O(P.A)
Select Z = 0, B = I(K, A)
```

At numeral 750, the above results can be repartitioned based on the destination key "Z." Finally, at reference numeral 760 the resulting values are projected:

From R In Results

Return R.B.

The only assumption made about the underlying computational infrastructure is that given a set of nodes keyed by some partition key "PK," data in these nodes can be repartitioned based on a different partition key. FIG. 8 illustrates repartitioning a partition of source partition of two collections 810 and 820 in a target partition of three collections 830, 840 and 850. The un-hashed sub-collections in each source go into a new all un-hashed target collection, the vertically hashed sub-collections go into an all vertically hashed target collection, etc. The target partition of a give element of a source partition may be determined by a given mapping. For example, the repartitioning can be denoted as in an exemplary language:

```
From P In CurrentPartition
Group By TargetPartitionKey = F(P)
Aggregate Items = Group( )
Select TargetPartition, Items
```

This is easy to generalized using user-defined aggregates, where at 730 of FIG. 7 a Merge function is employed to combine partially computed aggregates and a Terminate function is used to compute the final result after 730 or 750.

There are a various ways to increase evaluation parallelism. For example, from the perspective of a locally executing query on a node with partition keys in Range, a repartition of a (unpartitioned) table "Xs" on key "k" is just a filter expression of the form From X In Xs Where (X.k In Range). This implies a local query can be started while repartitioning is still in progress. With respect to FIG. 8, for example, a query that runs on 830 can start executing while data is still being sent from 810 and 820.

Similarly, note that acts 710 and 720, and acts 740 and 750, and in general selecting a key "K" . . . . Select K,R and then repartitioning based on "K," can be combined when the Select operator sends the tuples it creates to the proper node for processing. Again, this is a possibility for pipelined processing of the query.

Further, in act 710, the complete group need not be processed prior to moving on to the next action. In fact, action 710 can forward any intermediate result for group K to node K for final processing. Only act 730 needs to wait sending its results until all input has been received.

Figure 9:
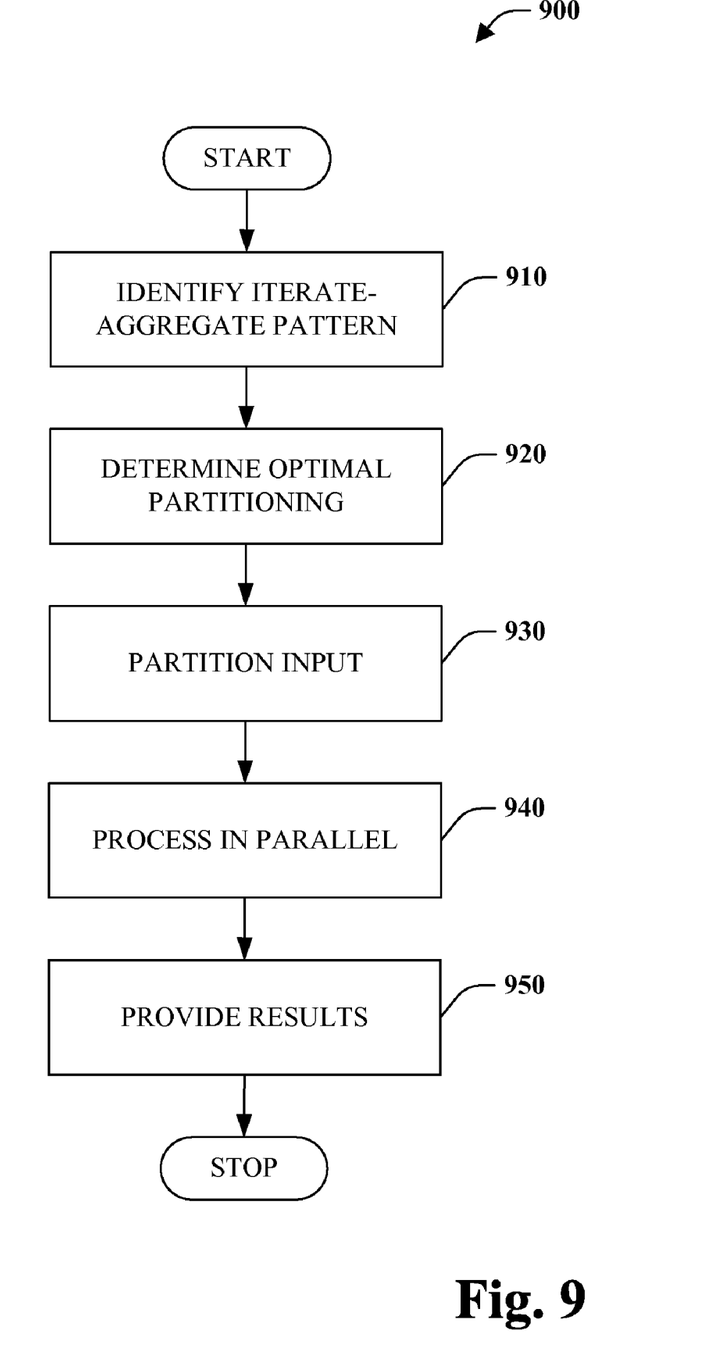
FIG. 9 is a flow chart diagram of a method of processing an iterate-aggregate shape query.

Turning attention to FIG. 9, a method 900 of processing iterate-aggregate queries is illustrated in accordance with an aspect of the disclosure. At reference numeral 910, an iterate-aggregate shape query is identified. As previously discussed, such a query includes a function that maps data to particular key-value pairs and consolidates key-value pairs sharing the same key to single key values. For example, a function can map over an input dataset and then group and aggregate results into a result set.

At reference 920, optimal partitioning is determined for example based on information about a data set and/or resources. In one embodiment, a variation of a matrix multiplication algorithm can be utilized to identify optimal groupings. A bottom-up dynamic programming method can be employed wherein costs are identified with respect to smaller groupings and utilized to calculate an execution cost associated with larger partitions. The optimal partitions together will execute over available resources at the lowest cost. A data collection is partitioned at 930 in accordance with the identified optimal partitions.

At reference numeral 940, the queries are executed in parallel across multiple resources. Evaluation of such queries produces partial results, which can be utilized to generate final results via repartitioning and aggregation, for example. Parallel query execution includes vertical or pipeline parallelism and/or flat or horizontal parallelism. Further yet, such vertical parallelism can be recursive in nature where in the same query is executed across multiple partitions and is operable to further split the partition for processing where appropriate. Final results can subsequently be provided at numeral 950.

The word "exemplary" is used herein to mean serving as an example, instance or illustration. Any aspect or design described herein as "exemplary" is not necessarily to be construed as preferred or advantageous over other aspects or designs. Furthermore, examples are provided solely for purposes of clarity and understanding and are not meant to limit the subject innovation or relevant portion thereof in any manner. It is to be appreciated that a myriad of additional or alternate examples could have been presented, but have been omitted for purposes of brevity.

Furthermore, all or portions of the subject disclosure may be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 10:
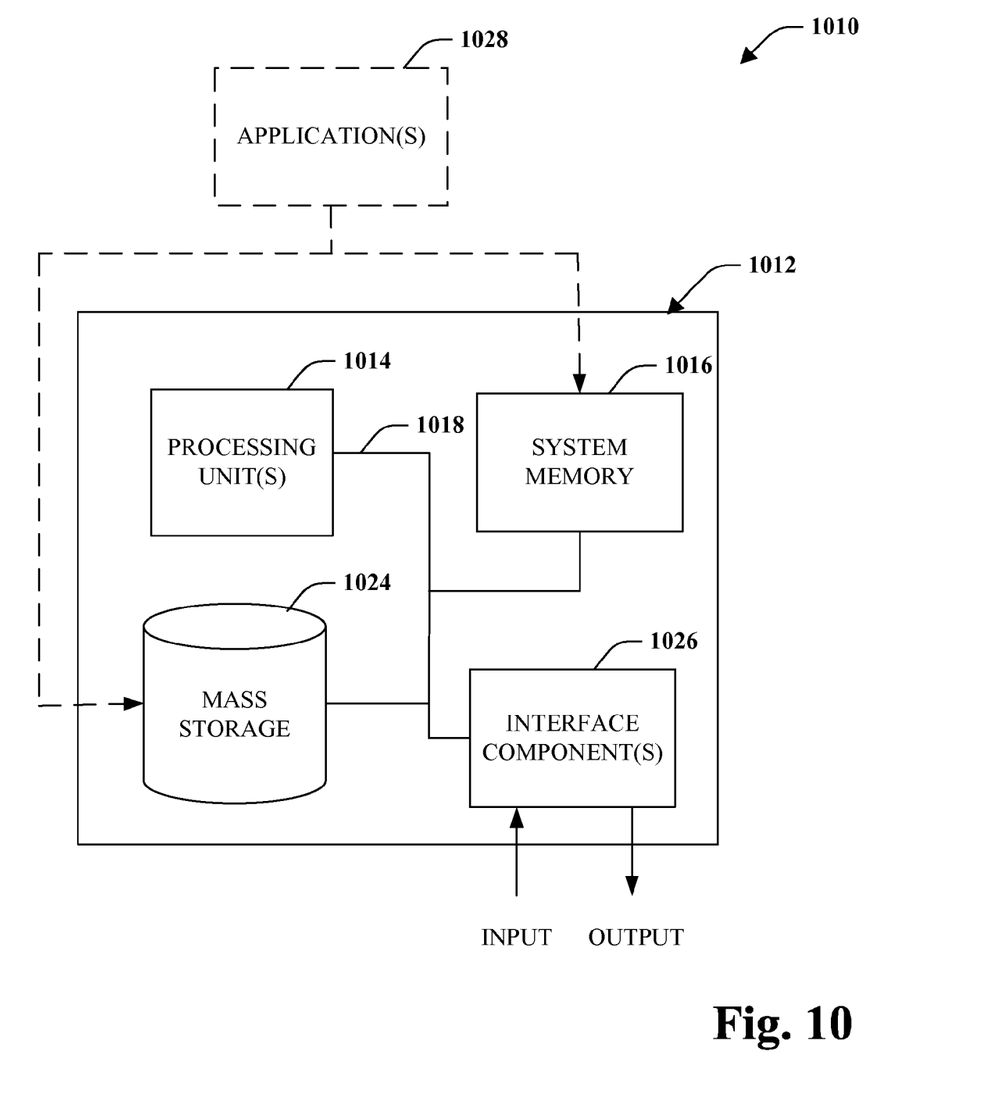
FIG. 10 is a schematic block diagram illustrating a suitable operating environment for aspects of the subject innovation.
Figure 11:
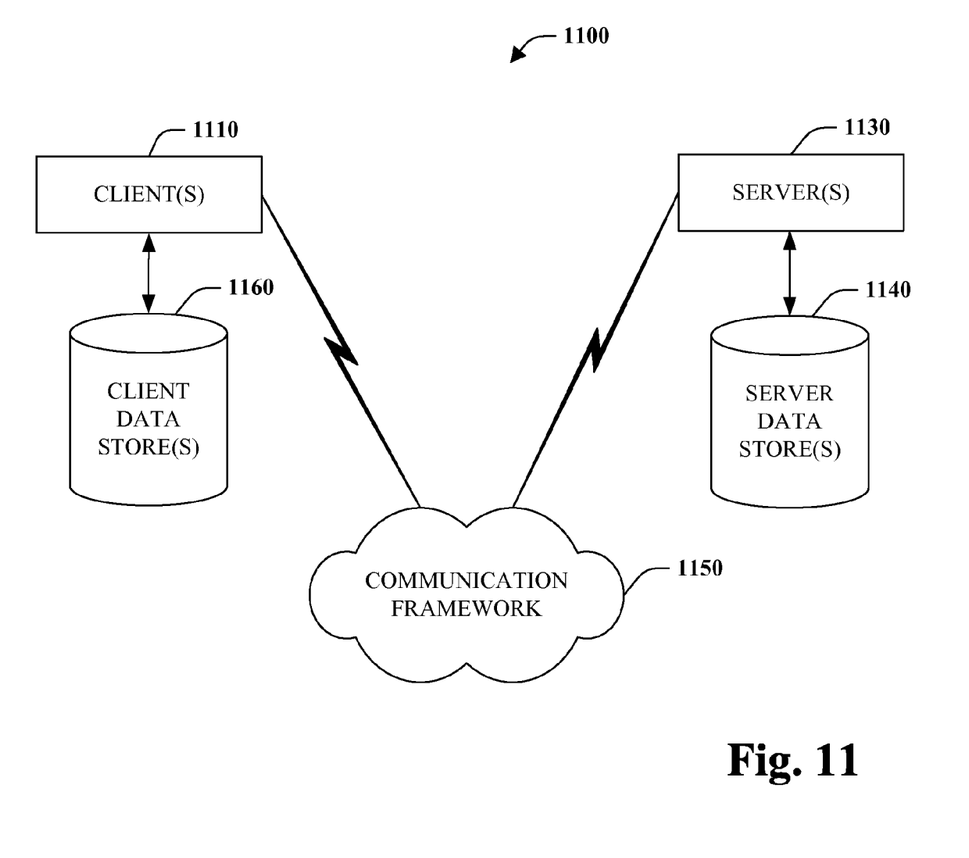
FIG. 11 is a schematic block diagram of a sample-computing environment.

In order to provide a context for the various aspects of the disclosed subject matter, FIGS. 10 and 11 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed innovation can be practiced on stand-alone computers. In a distributed computing environment, program modules may be located in both local and remote memory storage devices.

With reference to FIG. 10, an exemplary environment 1010 for implementing various aspects disclosed herein includes a computer 1012 (e.g., desktop, laptop, server, hand held, programmable consumer or industrial electronics . . . ). The computer 1012 includes a processing unit 1014, a system memory 1016 and a system bus 1018. The system bus 1018 couples system components including, but not limited to, the system memory 1016 to the processing unit 1014. The processing unit 1014 can be any of various available microprocessors. It is to be appreciated that dual microprocessors, multi-core and other multiprocessor architectures can be employed as the processing unit 1014.

The system memory 1016 includes volatile and nonvolatile memory. The basic input/output system (BIOS), containing the basic routines to transfer information between elements within the computer 1012, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 1012 also includes removable/non-removable, volatile/non-volatile computer storage media. FIG. 10 illustrates, for example, mass storage 1024. Mass storage 1024 includes, but is not limited to, devices like a magnetic or optical disk drive, floppy disk drive, flash memory or memory stick. In addition, mass storage 1024 can include storage media separately or in combination with other storage media.

FIG. 10 provides software application(s) 1028 that act as an intermediary between users and/or other computers and the basic computer resources described in suitable operating environment 1010. Such software application(s) 1028 include one or both of system and application software. System software can include an operating system, which can be stored on mass storage 1024, that acts to control and allocate resources of the computer system 1012. Application software takes advantage of the management of resources by system software through program modules and data stored on either or both of system memory 1016 and mass storage 1024.

The computer 1012 also includes one or more interface components 1026 that are communicatively coupled to the bus 1018 and facilitate interaction with the computer 1012. By way of example, the interface component 1026 can be a port (e.g., serial, parallel, PCMCIA, USB, FireWire . . . ) or an interface card (e.g., sound, video, network . . . ) or the like. The interface component 1026 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 1012 to output device(s) via interface component 1026. Output devices can include displays (e.g., CRT, LCD, plasma . . . ), speakers, printers and other computers, among other things.

FIG. 11 is a schematic block diagram of a sample-computing environment 1100 with which aspects of the disclosure can interact. The system 1100 includes one or more client(s) 1110. The client(s) 1110 can be hardware and/or software (e.g., threads, processes, computing devices). The system 1100 also includes one or more server(s) 1130. Thus, system 1100 can correspond to a two-tier client server model or a multi-tier model (e.g., client, middle tier server, data server), amongst other models. The server(s) 1130 can also be hardware and/or software (e.g., threads, processes, computing devices). The servers 1130 can house threads to perform transformations by employing the aspects of the subject innovation, for example. One possible communication between a client 1110 and a server 1130 may be in the form of a data packet transmitted between two or more computer processes.

The system 1100 includes a communication framework 1150 that can be employed to facilitate communications between the client(s) 1110 and the server(s) 1130. The client(s) 1110 are operatively connected to one or more client data store(s) 1160 that can be employed to store information local to the client(s) 1110. Similarly, the server(s) 1130 are operatively connected to one or more server data store(s) 1140 that can be employed to store information local to the servers 1130. In one instance, client(s) 1110 can execute or initiate execution of an iterate-aggregate shape query of a data collection, and a plurality of servers 1130 can provide computational resources for parallel execution of such a query.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations in form thereof are used in either the detailed description or the claims, such terms are intended to be inclusive in a manner similar to the term "comprising" as "comprising" is interpreted when employed as a transitional word in a claim.

What is claimed is:

1. A query execution system, comprising:
 a processor configured to facilitate execution of queries, wherein the queries comprise an iterate-aggregate shape query;
 an identification component configured to identify the iterate-aggregate shape query;

an execution component configured to process the iterate-aggregate shape query recursively in parallel over multiple partitions of data; and an optimization component configured to:
- identify optimal partitioning of data, based, at least, in part, on information about the data or available resources; and
- employ a modified matrix multiplication technique to identify an optimal manner for parenthesizing associative operations associated with a specified number of partitions of data,
  - wherein the partitions of data have respective matrix sizes, and
  - wherein the optimal manner for parenthesizing associative operations minimizes a number of operations for executing matrix multiplication of the partitions of data.

2. The system of claim 1, wherein the iterate-aggregate shape query is integrated within a programming language.

3. The system of claim 2, wherein the iterate-aggregate shape query includes at least one of transformation, filtering, self-joins or user-defined aggregates.

4. The system of claim 1, further comprising a partition component configured to segment the data into the multiple partitions.

5. The system of claim 4, wherein the optimization component is also configured to infer optimal partitioning of the data based, at least, in part, on contextual information regarding at least one of the data or resources.

6. The system of claim 1, further comprising an evaluation component configured to evaluate the iterate-aggregate shape query iteration and a portion of the aggregation in parallel over the multiple partitions.

7. The system of claim 6, further comprising a repartition component configured to repartition results from the evaluation component by like keys.

8. The system of claim 7, further comprising an aggregation component configured to complete iterate-aggregate shape query aggregation for each range of keys.

9. The system of claim 7, wherein the repartition component is configured to repartition reduced results based, at least, in part, on a destination key.

10. The system of claim 9, further comprising a projection component configured to project the reduced results into a structure.

11. A parallel processing method, comprising:
executing computer-readable instructions stored on a computer-readable medium for performing the following acts:
- identifying an iterate-aggregate shape language integrated query;
- executing the iterate-aggregate shape language integrated query recursively in parallel;
- identifying an optimal manner for grouping associative operations associated with a specified number of partitions of data,
  - wherein the partitions of data have respective matrix sizes, and
  - wherein the optimal manner for grouping associative operations minimizes a number of operations for executing matrix multiplication of partitions of data; and
- segmenting the data to partition the data into the specified number of partitions based, at least, in part, on the identified optimal manner for grouping associative operations associated with the specified number of partitions of data.

12. The method of claim 11, further comprising partitioning input data.

13. The method of claim 12, further comprising mapping the partitioned input data to key-value pairs in accordance with the iterate-aggregate shape language integrated query.

14. The method of claim 13, further comprising grouping the key-value pairs in accordance with the iterate-aggregate shape language integrated query.

15. The method of claim 14, further comprising aggregating the data associated with each key of the key-value pairs to produce partial aggregate results.

16. The method of claim 15, further comprising repartitioning the partial aggregate results by each key of the key-value pairs.

17. The method of claim 16, further comprising concurrently aggregating the data and repartitioning the partial aggregate results.

18. The method of claim 17, further comprising aggregating the partial aggregate results.

19. An iterate-aggregate query execution system, comprising:
- a processor configured to facilitate execution of queries, wherein the queries comprise a language integrated iterate-aggregate shape query;
- a partition component configured to partition data identified by the language integrated iterate-aggregate shape query;
- an evaluation component configured to perform parallel evaluation of the partitioned data in accordance with the language integrated iterate-aggregate shape query;
- a repartition component configured to repartition results of the parallel evaluation;
- an aggregation component configured to reduce the repartition results to a single response; and
- an optimization component configured to:
  - identify optimal partitioning, based, at least, in part, on information about the data or available resources; and
  - employ a modified matrix multiplication technique to identify an optimal manner for grouping mathematical associative property operations associated with a specified number of partitions of data,
    - wherein the partitions of data have respective matrix sizes, and
    - wherein the optimal manner for grouping mathematical associative property operations minimizes a number of operations for executing matrix multiplication of the partitions of data.

20. The system of claim 19, wherein the information is static information.

* * * * *

UNITED STATES PATENT AND TRADEMARK OFFICE
CERTIFICATE OF CORRECTION

PATENT NO. : 7,680,765 B2  Page 1 of 1
APPLICATION NO. : 11/616712
DATED : March 16, 2010
INVENTOR(S) : Henricus Johannes Maria Meijer et al.

It is certified that error appears in the above-identified patent and that said Letters Patent is hereby corrected as shown below:

In column 33, line 20, delete "an" and insert -- a --, therefor.

Signed and Sealed this
Nineteenth Day of July, 2011

David J. Kappos
*Director of the United States Patent and Trademark Office*